United States Patent [19]

Winzen

[11] 4,054,521
[45] Oct. 18, 1977

[54] INDEXING MECHANISM

[75] Inventor: John P. Winzen, Palos Verdes Estates, Calif.

[73] Assignee: Brunswick Corporation, Skokie, Ill.

[21] Appl. No.: 615,517

[22] Filed: Sept. 22, 1975

Related U.S. Application Data

[63] Continuation-in-part of Ser. No. 252,103, May 10, 1972, Pat. No. 3,912,632.

[51] Int. Cl.² .................................................. B01D 29/02
[52] U.S. Cl. ..................................... 210/137; 55/352; 55/354; 210/387
[58] Field of Search ............... 210/97, 90, 387, 137, 210/103; 55/352, 354

[56] References Cited

U.S. PATENT DOCUMENTS

| | | | |
|---|---|---|---|
| 3,332,215 | 7/1967 | Revell | 55/352 X |
| 3,379,206 | 4/1968 | Whiting | 210/90 X |
| 3,465,707 | 9/1969 | Kashiwaba | 210/90 X |
| 3,552,098 | 1/1971 | Cochran | 55/352 X |
| 3,855,126 | 12/1974 | Smith | 210/387 |

Primary Examiner—John Adee
Attorney, Agent, or Firm—John G. Heimovics; David S. Guttman; Sheldon L. Epstein

[57] ABSTRACT

The invention relates to a continuous and controlled filter device that filters gases and liquids while maintaining a low differential pressure across the filter element. The device automatically advances clean filter medium into the filter seat or window when the differential pressure rises to a predetermined level replacing dirty filter medium with clean filter medium. The advance of the filter medium is effected by a fluid pressure operated expansible device cooperating with an indexing device for positioning the filter medium as a function of the pressure differential extending thereacross. The indexing device may include a ratchet structure for positively positioning preselected portions of the filter medium across the flow passage through which the fluid being filtered is passed.

1 Claim, 15 Drawing Figures

INDEXING MECHANISM

CROSS-REFERENCE TO RELATED APPLICATIONS

This application is a continuation-in-part of my copending application Ser. No. 252,103, filed May 10, 1972 now U.S. Pat. No. 3,912,632, which was a continuation application of U.S. application Ser. No. 28,307, filed Apr. 14, 1970, now abandoned.

BACKGROUND OF THE INVENTION

There are many systems, particularly those used in aerospace fluid power applications, such as propellant feed systems, wherein the operating cycles, pressure supplies, or fluid volumes are either fixed or otherwise limited. This makes it mandatory that the pressure drop caused by a filter be controlled in terms of degree and rate of increase in order to prevent flow decay and to maintain proper system pressure, mixture ratios and response times.

This degree and rate at which the differential pressure of a filter of a specific filtration efficiency increases during a typical operational cycle of a given system, however, is affected by a number of constantly changing conditions. These conditions are the amount of entrained contaminants, the rate of contaminant generation, the size of the particles generated, and the physical and chemical composition of the contaminants. In addition, the differential pressure buildup of the filter varies as a function of a number of other conditions or combinations thereof. These functions are the type of system, the type of fluid medium, the flow rate, system pressure, total fluid flow, pressure and flow surges, vibration and other environmental conditions during the complete operational cycle.

Even when a filter is properly sized, however, the present methods or configurations provide no means of determining how much of the useful service life of the filter has been expended at any point during its period of operation, nor do they provide any warning of the approaching end of the service life cycle. This is due to the fact that the initial pressure loss caused by the filter at rated flow is almost entirely due to its port connections and other restrictions within the filter housing. Thus, the pressure drop of the filter does not increase significantly until most of its service life has been expended. As soon as the increase does become measurable, however, the pressure drop rises asymptotically until it reaches the systems operating pressure. This high pressure, in turn, makes it necessary to provide supporting structures on the downstream side of the filtering element to prevent its collapse at the maximum transient pressures of the system. The supporting structure further increases the size and weight of the filter assembly.

In addition, the uncontrolled buildup of differential pressure across the filter element causes trapped particles to be forced deeper into the filter medium capillaries and makes it difficult to reclean such units after usage. It is common practice to clean or replace the filter element at periodic overhaul periods and as a result, most filters in use are replaced or recleaned far too frequently which adds unnecessary operational costs.

Another problem area associated with the present methods and configurations is caused by the fact that as the filter removes contaminants from the fluid, the mean pore size of the filtering medium gets smaller due to partial or complete blockage of the capillaries. This results in the retention of contaminants from the fluid which are smaller than the filter is initially designed to remove to protect the system. This retention of smaller particles, in turn, accelerates the rate of differential pressure buildup towards the end of the filter's service life.

SUMMARY OF THE INVENTION

It is an object of this invention to provide a continuous and controlled filtration of fluids.

Another object of this invention is to provide filtration of fluids while maintaining a relatively constant low differential pressure over a long period of filtration time.

Another object of this invention is to control filtration efficiency throughout the system service life.

Another object of this invention is to eliminate the contamination of the fluid system which is introduced during the replacement of filter elements of fixed size filters.

Another object of this invention is to provide a continuous visible indication of the amount of filter service life used or remaining, and of trends or changes in the gravimetric contaminant level of the system fluid.

Another object of this invention is to provide built-in feedback information for remote data acquisition of used and remaining filter service life and contaminant level trends within the system.

Another of the objects of this invention is to measure and record the amount of water in liquids. The rate of change and increase in differential pressure across a porous material, with known water absorption, will provide quantitative values and indicate trends of moisture in liquids.

Another of the objects of this invention is to measure and control the humidity of a chamber, cell or room. The atmosphere of the chamber would be sampled through the invention. The change in the differential pressure across the moisture absorbing porous material will, in conjunction with a control system, result in the adjustment of the humidity in the chamber.

Still another object of the invention is to provide an improved filter device wherein the positioning means includes an indexing means and a fluid pressure operated expansible means.

BRIEF DESCRIPTION OF THE DRAWING

Some of the objects of the invention having been stated, other objects and features will become apparent from the following accompanying drawings in which.

DESCRIPTION OF THE PREFERRED EMBODIMENT

Figures 1, 2, 3:
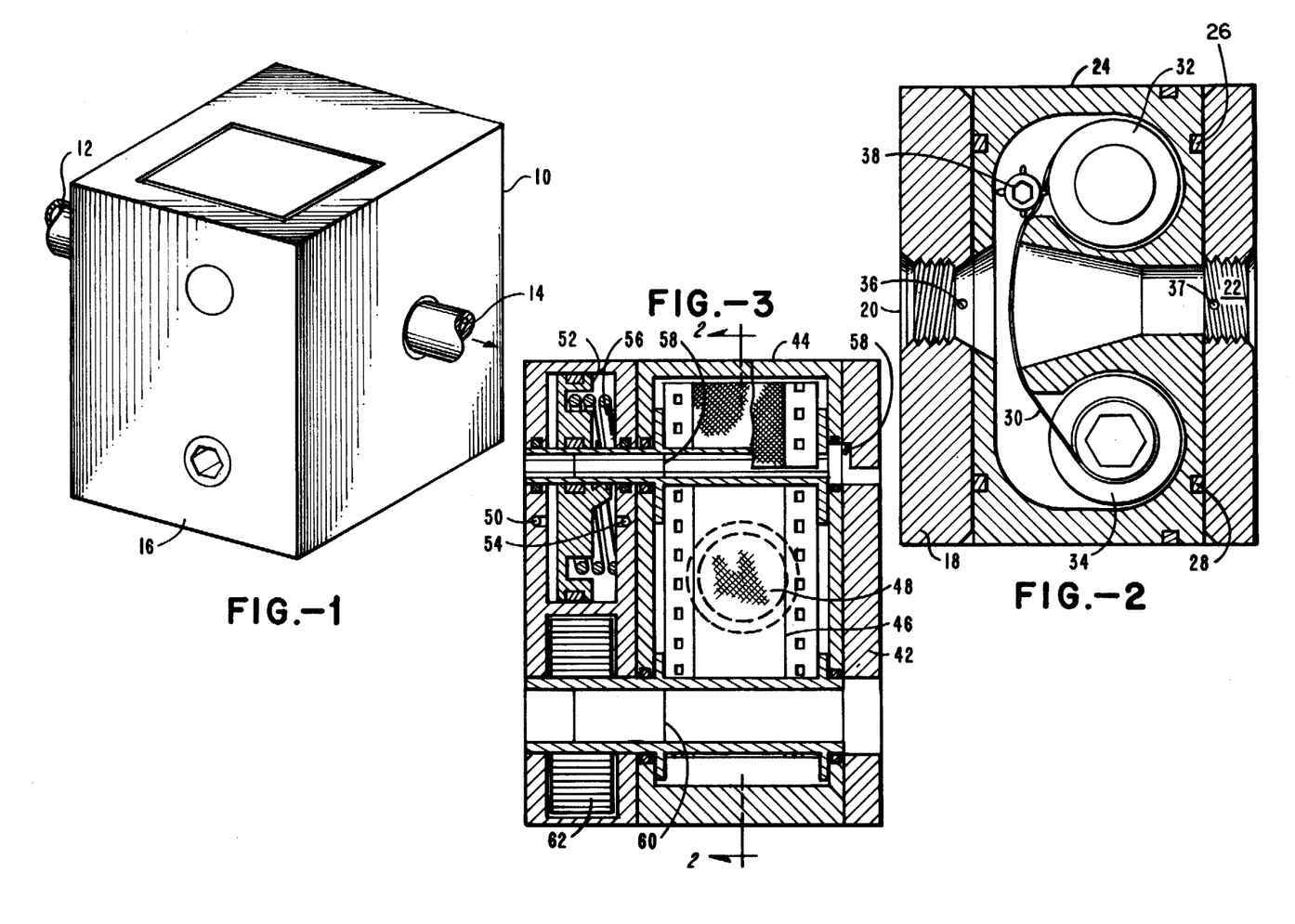
FIG. 1 is an overall perspective view of the device of the present invention.
FIG. 2 is a cross-sectional view taken of a device of the present invention.
FIG. 3 is a cross-sectional view of a device of the present invention.

Referring now to FIG. 1, there is shown the case 10 housing the device of the present invention. An inlet line 12 and exit line 14 allow the fluid stream to be filtered to pass into and out of the filter device of this invention. A cartridge assembly 16 fits into the case assembly 10 of the present invention. This cartridge assembly may be easily slipped into place and out of place when replacement is necessary.

Referring now to FIG. 2, there is shown a spring motor powered concept of this invention. However, it is pointed out that electrical, hydraulic or pneumatic motors may be used in lieu of the spring motor shown.

There is shown the case assembly 18 having an inlet port 20 and an outlet port 22 into which is placed a closely fitting cartridge assembly 24. Cartridge assembly 24 is fluidically sealed to case assembly 18 by seals 26 and 28, and is mechanically secured in place by a shaft coupling shown in FIG. 3.

The system fluid enters inlet port 20 and is filtered by the strip filter element 30 and then passes through outlet port 22. Strip filter 30 is wound on supply spool 32 and moves to take-up spool 34.

As the fluid system contaminants collect on the strip filter element 30, the differential pressure across the filter element increases. A pressure sensing line 36 is routed from the upstream side of the filter element to one side of the differential pressure sensor shown hereafter in FIG. 3. Another pressure sensing line 37 is routed from the downstream side of the filter element to the other side of the differential pressure sensor. When the differential pressure across the filter element 30 reaches a predetermined value, the higher pressure overbalances the differential pressure sensor and causes it to move inboard. The inboard motion of the sensor disengages a stop from a pin in the advancement control shaft 38. The motion can be inboard or outboard depending on the orientation of the sensor and advancement control pins.

When the stop is no longer engaged, the drive mechanism shown in FIG. 3 permits the take-up spool 34 to rotate. The rotation of the take-up spool 34 winds up the dirty filter element 30 onto the take-up spool 34. This action starts the movement of clean filter strip across the filter seat window 40 and causes the differential pressure across the filter to drop. As the differential pressure across the filter seat window 40 decreases, the pressure sensor 52 moves outboard. The outboard motion of the sensor moves a stop into position to engage with the next pin in the advancement control 38. The pins in the advancement control 38 are located in a manner to permit the indexed movement of clean filter strip across the entire filter seat window before the next pin is engaged with the stop.

Referring now to FIG. 3, there is shown the case assembly 42 and the cartridge assembly 44 showing filter strip 46 having filter seat window 48. Pressure sensing line 50 is routed from the upstream side of the filter element to one side of the differential pressure sensor 52. Another pressure sensing line 54 is routed from the downstream side of the filter element to the statically loaded side of the differential pressure sensor 52.

The differential pressure sensor 52 is a balanced pressure device made of a balance piston with ring seals, a pilot valve with close fits utilizing spring 56. These types of pressure sensing devices are common in the art and other well known types may also be used, such as a bellows type with no seals or springs, or a diaphragm type of single or bimetallic laminates. The type of balance pressure device is governed by the type of media being filtered.

A clutch 58, or a spring drag device, is attached to the supply spool 32, as shown in FIG. 2, in order to keep filter element 46 under tension and in intimate contact with the filter seat 40 when the filter strip 30 is in motion. When the filter strip 46 has been used up, the cartridge assembly 44 may be replaced with a new one by retracting couplings 58 and 60 from the shaft of the supply spool 32, and the take-up spool 34. A new cartridge assembly is placed on top and in line with the used cartridge assembly 44. Couplings 58 and 60 are retracted from the shaft of the supply spool 32 and a new cartridge is pushed down until it is flush with the top of the case assembly 42. Couplings 58 and 60 are then engaged with the shafts of the supply and take-up spools. Before engaging coupling 60 with the shaft of the take-up spool 34, the drive mechanism 62 is adjusted to its full operating positions, then coupling 60 is engaged with the shaft of the take-up spool 34.

A supply indicator may be plugged into coupling 60 or the shaft in the take-up spool 34. The supply indicator gives a continuous indication of the amount of unused strip filter 30 which is left on supply spool 32. An elapsed time indicator which indicates the calendar time that the cartridge assembly has been in service may also be plugged into the coupling 60 or the shaft in the take-up spool 34.

The drive mechanism 62 shown is a spring; however, electrical or pneumatic motors may be used in lieu of a spring motor.

The strip filter medium is any of a well known variety of filter mediums, such as those described in U.S. Pat. No. 3,426,910 issued to John P. Winzen.

Figure 4:
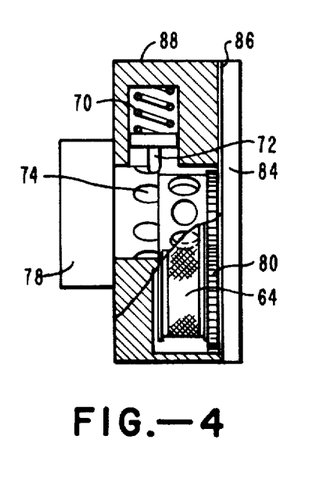
FIG. 4 is a side elevation partially broken away of a device of the present invention.
Figure 5:
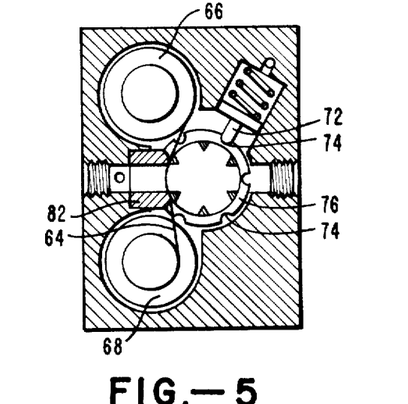
FIG. 5 is a side elevation partially broken away of a device of the present invention.

Referring to FIGS. 4 and 5, there is shown a noncartridge variation of the present invention. In this concept, the strip filter 64, supply spool 66 and take-up spool 68 only are removed and replaced. The principle of operation is similar to that shown in FIGS. 1, 2 and 3, except that, when the differential pressure across the filter element exceeds a predetermined value, the differential pressure sensor 70 withdraws the advancement control pin 72 from the indent cavity 74 in the sprocket 76. The drive mechanism 78 rotates the sprocket 76 and gears 80. The sprocket 76 draws clean filter strip across the filter seat window 82 and the gears rotate the take-up spool 68 winding up the dirty filter element. Small pins in each side of the sprocket 76 move and guide the filter strip 64. When clean filter covers the window in the filter seat 82, the differential pressure across the filter strip reduces causing differential pressure sensor 70 to engage the advancement control pin 72 with the indent cavity 74 in sprocket 76.

The drive mechanism 78 may be located internally or externally as a plug-in unit. Slip clutches are used on both the supply spool 66 and the take-up spool 68 to maintain tension on the filter strip 64. When the filter strip 64 has been used up, it may be replaced with new filter by shutting off the system fluid flow and removing cover plate 84. The old filter strip 64, supply spool 66 and take-up spool 68 are removed. The drive mechanism 78 is adjusted to full operating position. A new filter strip supply spool and take-up spool are inserted and the advancement control pin is engaged in the strip filter and indent holes in the sprocket 76. The cover plate 84 is replaced. A seal 86 is located between cover plate 84 and the case assembly 88 to prevent leakage at this interface.

Figure 6:
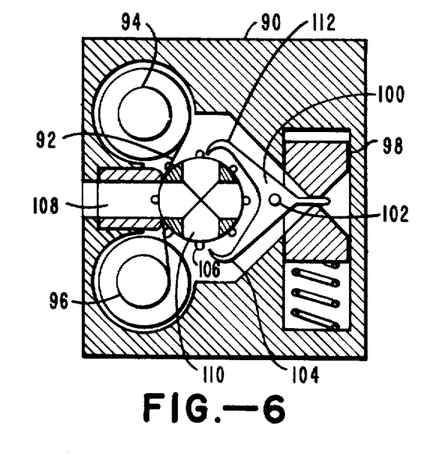
FIG. 6 is a side elevation partially broken away of a device of the present invention.

Referring now to FIG. 6, there is shown an escapement mechanism for controlling the advancement of the strip filter. This mechanism is an alternate control to the one shown in FIGS. 4 and 5. There is shown the case assembly 90, the strip filter 92 and supply spools 94 and take-up 96. When the differential pressure across the filter strip 92 exceeds a predetermined value, the differential pressure sensor 98 rotates the escapement 100 around a pivot 102 disengaging the stop 104 from sprocket pin 106. The drive mechanism, which is engaged with a take-up spool 96, rotates the take-up spool and winds dirty filter onto the spool. This action draws clean filter across the filter seat window 108 and rotates the sprocket 110. The rotation of sprocket 110 causes a sprocket pin to deflect the other prong 112 of the escapement 100 rotating escapement 100. This rotation brings the stop prong 104 of the escapement into contact with the next sprocket pin stopping the advancement of the strip filter 92. The filter element and sprocket remain in this position until the differential pressure across the filter elements causes the escapement to rotate again.

Figure 7:
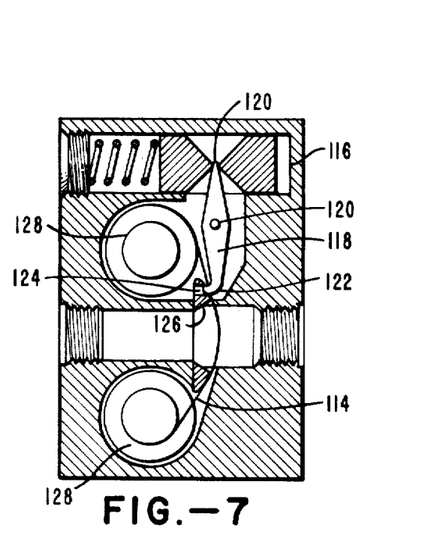
FIG. 7 is a side elevation partially broken away of a device of the present invention.

Referring now to FIG. 7, there is shown a pawl mechanism for controlling the advancement of the strip filter. When the differential pressure across the filter element 114 exceeds a predetermined value, the differential pressure sensor 116 rotates an advancement control 118 about a pivot 120 causing the pawl 122 to disengage from the detent 124 in the filter seat 126 and the slots in the strip filter 114. The drive mechanism rotates the take-up spool 128 winding up the dirty filter and drawing clean strip across the window in the filter seat. When clean filter has covered the window of the filter seat, the differential pressure is reduced causing the differential pressure sensor 116 to rotate the advancement control 118 and compel the pawls to engage the slots in the strip filter and detent hole 124 in the filter seat. The engagement of the pawl 122 in the strip filter stops the motion of the strip filter and places the strip filter under tension on the filter seat.

Figure 8:
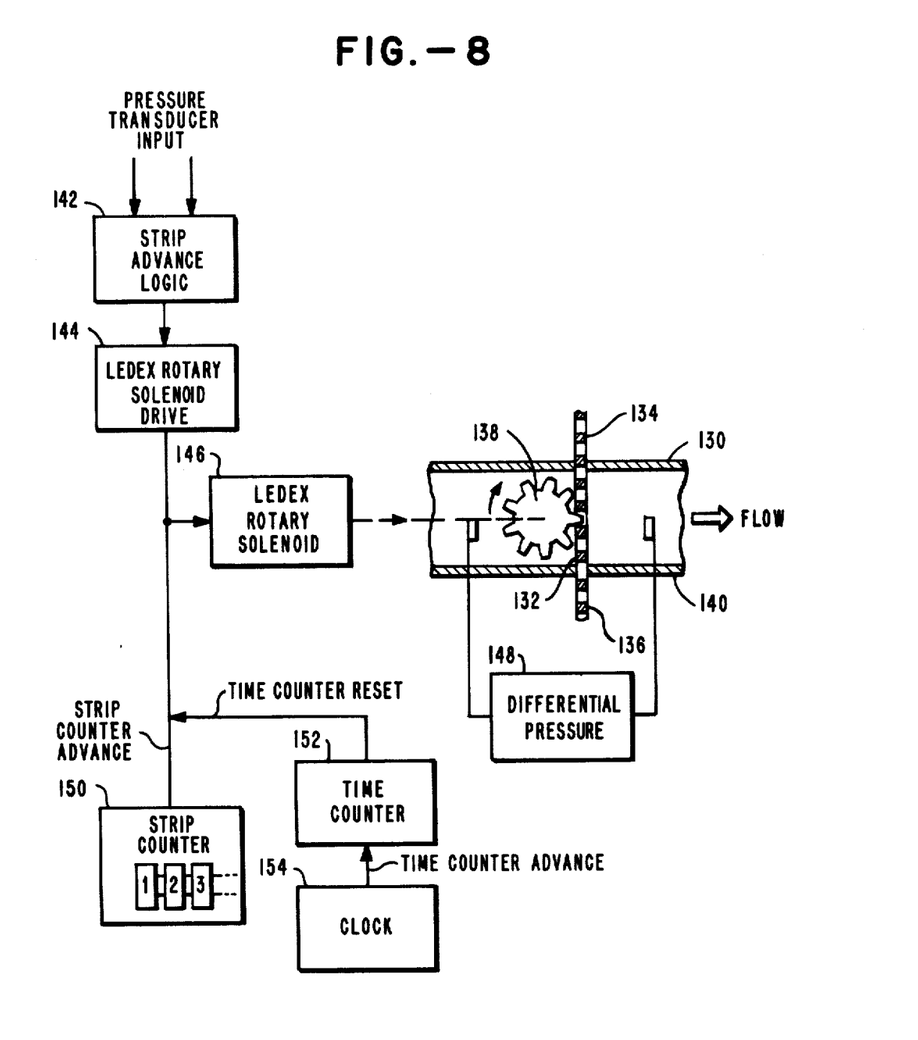
FIG. 8 is a diagrammatic arrangement of an electrically controlled device of the present invention.

FIG. 8 shows a diagram of an electrically controlled embodiment of the invention showing a cutaway portion of the case assembly 130 in which filter strip 132 with ends 134 leading from the supply spool 136 and leading to the take-up spool. Filter strip 132 is advanced by advancement control 138. The differential pressure sensor 148 is a pressure sensing electrical bridge-type transducer. As the differential pressure across the filter element increases, the bridge circuit of the pressure transducer supplies an increasing voltage to the strip advance logic circuit 142. When the bridge circuit voltage reaches a predetermined level strip, advance logic circuit 142 makes a decision to advance the strip filter.

At this time, the power transistors of the Ledex Rotary Solenoid Drive 144 are energized to supply enough power to put the Ledex Rotary Solenoid 146 into motion. The solenoid activates a linkage which, in turn, rotates a ratchet and moves clean filter 132 across the window of the filter seat.

The differential pressure is then reduced and the output voltage from the differential pressure transducer drops. The drop in voltage from the bridge circuit to the strip advance logic circuit 142 causes this circuit to decide that no further movement of the strip filter is required and deactivates the rotary solenoid system. Feedback from the bridge-type transducer or the strip advance logic circuit can be transmitted to a remote location for computer analysis or interpretation of performance data.

A strip counter advance circuit having a strip counter 150 or a time counter advance circuit having a time counter 152 and clock 154 may be utilized to give additional information as to the performance of the system.

Figures 9, 10:
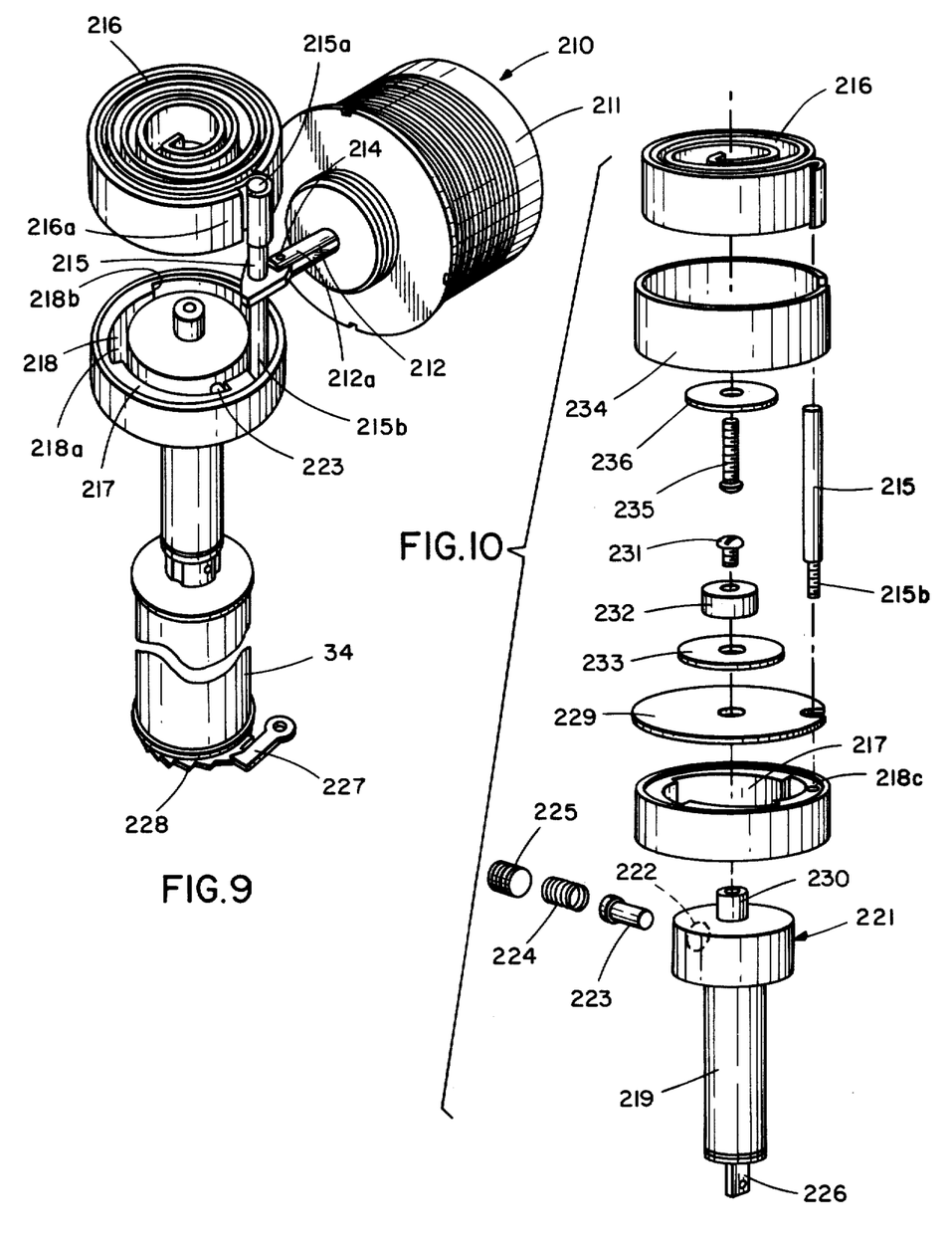
FIG. 9 is a fragmentary perspective view of a filter element positioning means embodying the invention.
FIG. 10 is an exploded perspective view of a portion thereof.

Referring now to the embodiment of FIGS. 9–15, an improved filter element advancing means generally designated 210 is illustrated. Advancing means 210 is adapted to provide an indexed advance of the take-up spool 34 so as to advance the strip filter element 30 in a step-by-step fashion as an automatic function of pressure differentials existing across the filter element. As shown in FIG. 9, the advancing means includes a fluid operated expansible device, illustratively comprising a bellows 211, having an output shaft 212. A hook 213 is pivotally connected to the distal end 212a of shaft 212 by a pivot 214, permitting pivotal movement of the hook about an axis perpendicular to the longitudinal extent of the shaft.

Hook 213 is adapted to selectively engage a connecting rod 215 having one end 215a connected to one end 216a of a coiled leaf spring 216. The opposite end 215b engages an indexing ratchet 217. Ratchet 217 includes a plurality of teeth 218, each having a forward sloping surface 218a and a rear radial shoulder 218b.

A connecting shaft 219 is provided at its upper end with a cylindrical head 220 adapted to be received rotatably coaxially within the annular ratchet 217. Head 220 is provided with a diametric bore 221 having a threaded end 222. A pawl 223 is slidably received in the bore and is urged radially outwardly external of the head 220 by a spring 224 adjustably compressed against the pawl by a set screw 225 threaded into bore end 222. The distal end of shaft 219 is provided with a connector 226 adapted to be releasably connected to take-up spool 34. To retain the filter element 30 suitably transversely across the flow passage through which the fluid to be filtered is passed, take-up spool 34 may be retained against reverse movement by a pawl 227 cooperating with a ratchet gear 228 on the take-up spool.

As best seen in FIG. 10, end 215b of connecting rod 215 may be threaded and received in a corresponding threaded hole 218c of one ratchet tooth 218. A cover plate 229 may be provided for closing the annular ratchet 217 and may be secured to a cylindrical boss 230 on head 220 by means of a screw 231, collar 232 and washer 233. Spring 216 may be retained in an annular housing 234 by a screw 235 and washer 236.

Figure 11:
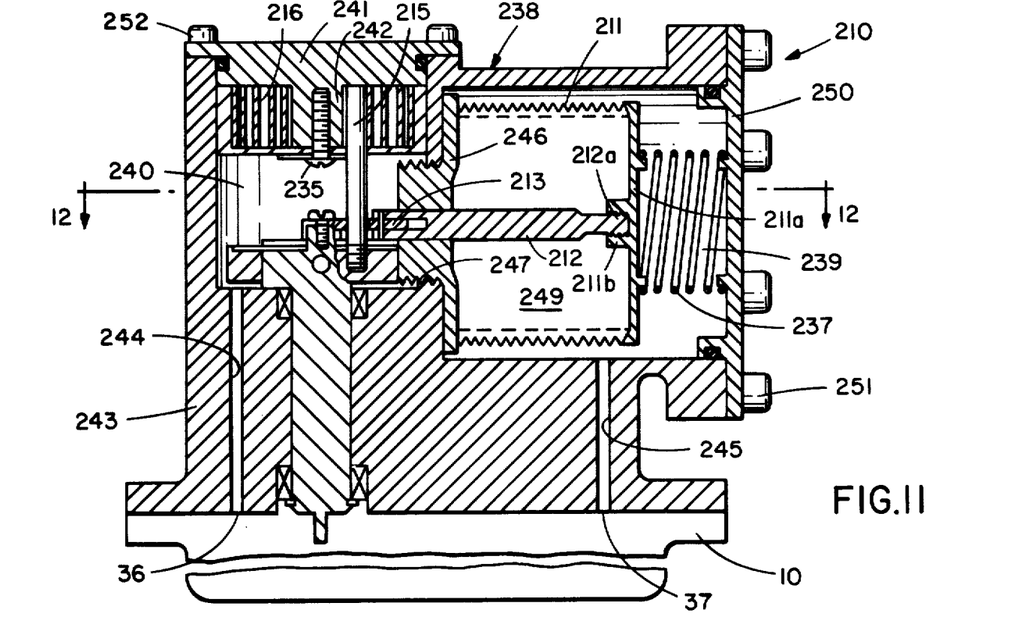
FIG. 11 is a fragmentary vertical section thereof.

As shown in FIG. 11, bellows 211 defines an outer wall 211a having an inwardly projecting boss 211b threadedly receiving the inner end 212b of shaft 212. The wall 211a is biased inwardly by a coil spring 237.

Apparatus 210 is enclosed within an outer housing 238 defining a first chamber 239 receiving bellows 211, and a second chamber 240 housing the indexing of the advancing means. As best seen in FIG. 11, the housing includes a removable spring carrier 241 having a post portion 242 about which spring 216 is wound. Screw 235 is coaxially threaded into post portion 242 to retain the spring housing 234 and spring 216 on the spring carrier 241.

Housing 238 includes a mounting portion 243 adapted to be secured to the case 10. A first passage 244 is provided through mounting portion 243 to communicate with the fluid flow passage through the pressure sensing line 36 and a second passage 245 is provided through mounting portion 243 to communicate with the fluid flow passage through the pressure sensing line 37. Passage 244 opens into chamber 240 and passage 245 opens into chamber 239. Communication between the two chambers is blocked by the base portion 246 of bellows 211 which may be threadedly secured to an inturned annular flange 247 in housing 238. A fluid passage 248 may be provided through base portion 246 to provide communication between chamber 240 and the interior space 249 of the bellows.

A closure plate 250 may be secured to housing 238 by suitable means, such as screws 251, to provide access to chamber 239 such as for servicing bellows 211. Spring carrier 241 is removably secured to the housing by similar suitable means, such as screws 252, to provide access to chamber 240 such as for servicing the spring and other indexing means parts.

Figure 12:
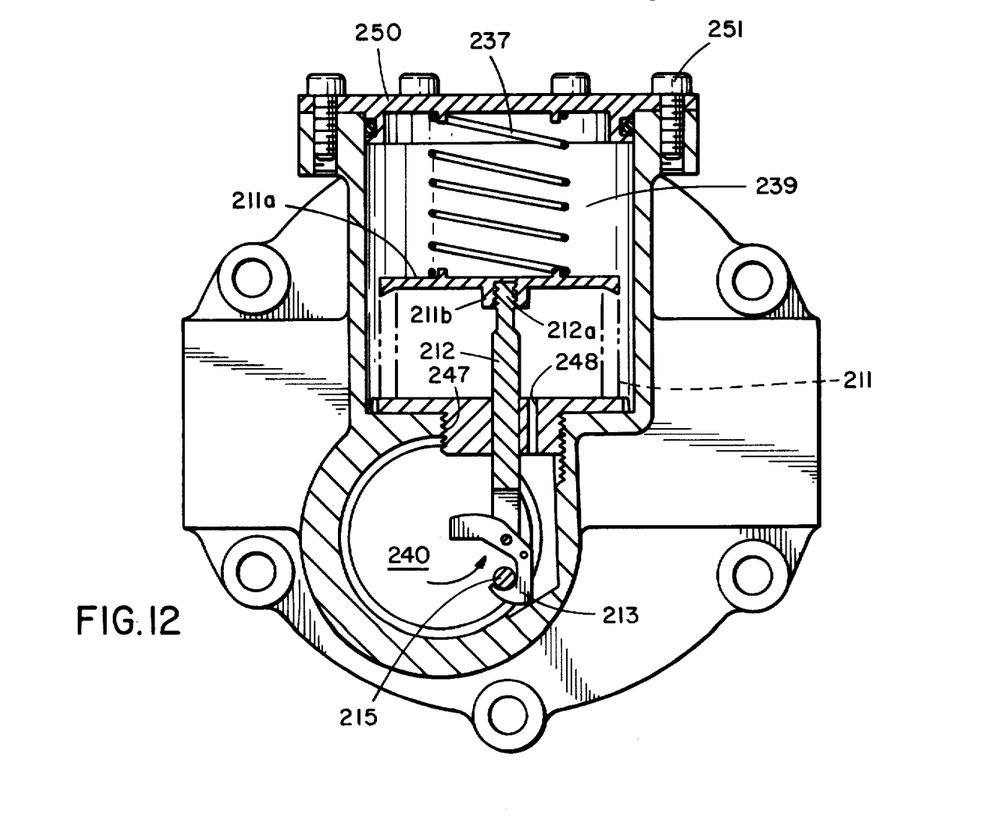
FIG. 12 is a horizontal section taken substantially along the line 12—12 of FIG. 11.

The operation of the improved strip filter element advancing means may best be understood by reference to FIGS. 12-15, respectively. As shown in FIG. 12, when the portion of the strip filter element extending across the flow passage is clean, the pressure differential across the filter is a minimum so that the pressure in chamber 240 is only slightly greater than the pressure in chamber 239. Thus, spring 237 compresses bellows 211 to a compacted arrangement whereby the shaft 212 is extended outwardmost from the bellows into chamber 240. Hook 213 is hooked about rod 215.

Figures 13, 14, 15:
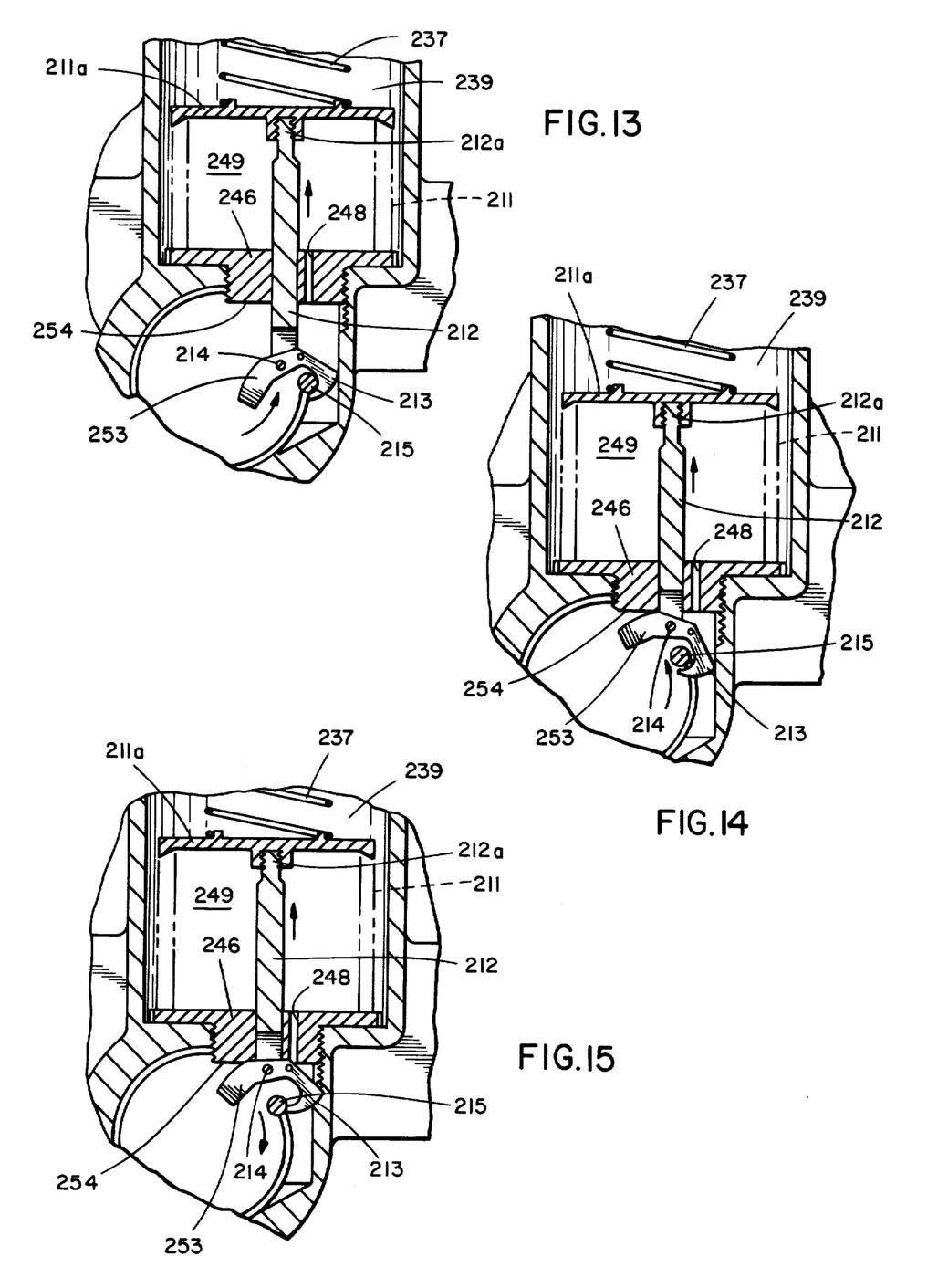
FIG. 13 is a fragmentary horizontal section similar to that of FIG. 12 but illustrating the arrangement of the advancing means with the bellows partially expanded corresponding to a partially clogged filter.
FIG. 14 is a fragmentary horizontal section similar to that of FIG. 12 but illustrating the arrangement of the advancing means with the bellows almost fully expanded corresponding to an almost fully clogged filter.
FIG. 15 is a fragmentary horizontal section similar to that of FIG. 12 but illustrating the arrangement of the advancing means with the bellows fully expanded to release the indexing means and effect a replacement of a spent portion of the cylinder with a clean portion.

As the pressure drop across the filter increases, such as from an increasingly clogged condition of the filter portion extending across the flow passage, the pressure in chamber 240 increases relative to the pressure in chamber 239 and this pressure being transmitted through passage 248 into the internal space 249 of the bellows reacts against the force of spring 237 to expand the bellows such as to the position illustrated in FIG. 13. The expansion of the bellows urges outer wall 211a away from base portion 246 and draws shaft portion 212a toward base portion 246 so as to urge connecting rod portion 215b in a counterclockwise direction, as shown in FIG. 13, by means of the hook 213. As connecting rod portion 215b is threaded to the ratchet, the ratchet correspondingly rotates in a counterclockwise direction causing pawl 223 to ride on the sloping surface 218a and be slowly urged into bore 221 against the action of spring 224 (see FIGS. 9 and 10). When the pressure drop across the portion of the filter element in the flow passage reaches a high value corresponding to an almost fully clogged condition of the filter, the expansion of the bellows is substantially complete, such as illustrated in FIG. 14, and a camming portion 253 of the hook is brought against a stop shoulder 254 on bellows base portion 246 to pivot the hook in a counterclockwise direction about pin 214.

As shown in FIG. 15, the fully clogged condition of the filter portion effects a sufficient pressure drop between chamber portions 240 and 239 to expand bellows 211 sufficiently to release hook 213 from connecting rod 215, permitting the spring 216 to rotate the ratchet 217 in a clockwise direction. In the expanded position of the bellows 211 of FIG. 15, pawl 223 passes to beyond the cam shoulder 218b, whereby the subsequent rotation of the ratchet teeth drives the pawl 223 correspondingly in a clockwise direction and correspondingly rotates connecting shaft 219 to drive the take-up spool 34 a preselected amount suitable to replace the spent portion of the filter element with a fresh or clean portion thereof. This transfer is effected quickly by the force of spring 216 with the bellows temporarily in the expanded condition of FIG. 15 and, thus with the hook 213 positioned as shown therein. However, the presentation of the clean filter portion across the flow passage substantially immediately causes a reduction in the pressure drop whereby the pressure in chamber 240 drops relative to the pressure in chamber 239 and the bellows is contracted by spring 237 back to the position of FIG. 12.

Thus, spool 34 is rotated successively during each such operation to present a fresh portion of the filter element across the flow passage as an automatic result of the pressure drop across the filter reaching a preselected high value corresponding to a clogged condition thereof. In the illustrated embodiment, the cam surfaces 218a extend approximately 90° with the shoulders 218b being thusly spaced 90° about the axis of rotation of spool 34. As will be obvious to those skilled in the art, any suitable extent of rotation may be effected by suitable control of the parameters of the structure.

The ratchet gear 228 and pawl 227 cooperate to prevent clockwise rotation of the spool 34 at all times, assuring the above described indexed step-by-step presentation of clean filter strip portions across the flow passage for improved fluid filtering.

Having fully described the invention and its utilities, it is desired that the invention be limited only by the scope of the appended claims.

I claim:

1. In a filter device having a filter element, means defining a flow passage, and support means for supporting a portion of the filter element across the flow passage for filtering contaminants from fluid passed therethrough, improved positioning means for sequentially moving the filter element transversely to the flow passage for selectively disposing different portions of the filter element across the flow passage, said positioning means comprising:
   a. an outer housing with said support means including a payoff spool and a take-up spool at opposite sides of the flow passage,
   b. the fluid pressure operated expansible means comprises a bellows mounted in the housing,
   c. indexing means operably associated with said support means for selectively positioning said different portions of the filter means across the flow passage means and including an escapement cam pivotally mounted on a rod slideably carried in the housing for movement by the bellows, means for biasing the cam, and a ratchet structure pivotally mounted within the housing and including a pawl coupled to the take-up spool, with the escapement cam operably associated therewith to cause indexed rotation of the take-up spool as a function of the pressure differential across said filter element portion, the ratchet includes a spring wound by the escapement as a function of the expansion of the bellows to rotate the ratchet a preselected maximum amount in tensioning the spring prior to disengagement of the escapement cam, the spring functioning to reverse the rotation of the pawl upon such disengagement, the bellows communicating with said flow passage at opposite sides of said filter element portion for operating said indexing means as a result of the pressure drop in said flow passage across said filter element portion reaching a preselected high value corresponding to a spent condition of the filter element portion to replace at least a preselected spent portion of the filter element with a fresh unspent portion for continued filtering of the fluid.

* * * * *